Nov. 28, 1961     R. H. J. GENESLAY     3,011,147

SELF-DIRECTING SEISMOGRAPH

Filed July 15, 1960

3,011,147
SELF-DIRECTING SEISMOGRAPH
Raymond Henri Joseph Geneslay, Bourg-la-Reine, France, assignor to Compagnie Generale de Geophysique, Paris, France, a corporation of France
Filed July 15, 1960, Ser. No. 43,118
Claims priority, application France July 21, 1959
6 Claims. (Cl. 340—17)

It is common practice, when executing a seismic prospection, to lay the seismographs along a cable and to insert them in said cable, which latter is unwound horizontally over the surface of the ground or positioned at the bottom of the sea, so as to collect the seismic vibrations produced, for instance, by the explosion of an explosive load, which is suitably positioned with reference to the cable.

The seismographs inserted in the cable assume therefore an angular setting which depends on the more or less fortuitous twisting to which the cable is subjected during its unwinding. In practice, it is not possible to govern such an angular setting. In other words, the casing of a seismograph of this type is substantially in the shape of a cylinder of revolution, the axis of which coincides or is parallel with the axis of the cable, while the angular setting referred to hereinabove is that of a plane associated with the casing and passing through its axis, the axis of the cable being obviously considered as horizontal.

It is however essential, with a view to obtaining a correct record, to set the seismograph in a suitable operative position, whatever may be its angular setting. It is thus necessary to resort to self-directed seismographs, which are designed in a manner such that their operation may be correct, whatever may be their angular setting.

My invention has for its object a particularly simple seismograph of this type, which is of a sturdy execution and which has a comparatively high sensitivity. According to my invention, the seismograph is chiefly constituted by a cylindrical rod or tube forming an inert mass suspended inside a casing secured to the cable through the agency of two spiral-shaped metal springs, said two springs, which are electrically insulated with reference to each other, forming the two electrodes of a condenser, the capacity of which varies, as disclosed hereinafter, under the action of the vertical vibrations transmitted by the ground or by water to the casing of the seismograph.

The spiral springs used include a number of convolutions, say about ten; at least one of said springs is coated throughout its surface with a thin insulating layer adapted to prevent any electric contact between the spirally-shaped springs, even if a mechanical contact is obtained in certain areas.

The capacity of the condensers thus formed is measured in any suitable manner, for instance by applying across the electrodes constituted by said springs an A.C. or D.C. voltage of a predetermined value, and by recording the modification of said value under the action of seismic vibrations.

I will now disclose my invention with further detail, reference being made to the accompanying drawings, wherein.

Figure 1:
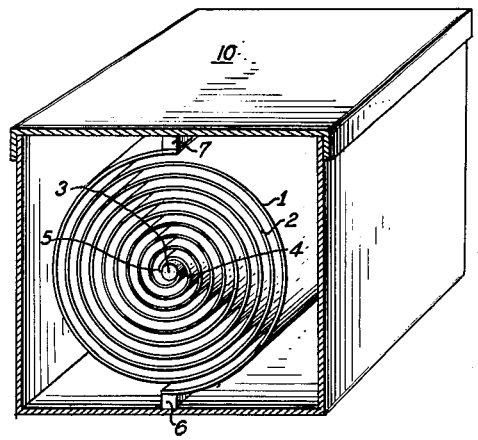
FIG. 1 is a diagrammatic cross-section of the seismograph when its axis is arranged vertically.

Turning to FIG. 1, which is a diagrammatic sectional view of the seismograph in a plane perpendicular to its axis assumed to be standing vertically, the inert mass 3 is constituted by a cylindrical tube or rod of a suitably selected diameter and length, so as to provide the desired weight for the inert mass.

To said mass 3 are secured, along generating lines 4 and 5 which are preferably located in diametrically opposed relationship, at opposite ends of a horizontal diameter, for instance, two spiral-shaped springs 1 and 2 similar to watch hairsprings. The spring 1 is illustrated by a solid line and the spring 2 by an interrupted line.

The outer ends of the two springs are attached to insulating terminals 6 and 7 which are in their turn secured to the casing of the seismograph, which casing is not illustrated.

In the position illustrated in FIG. 1 with the seismograph axis extending vertically, the spacing between two adjacent convolutions of the springs 1 and 2 is practically constant along the convolutions, as apparent from obvious reasons of symmetry, the springs being, of course, similar and accurately executed, so as to mate the well-known shape of a same geometrical spiral.

The springs 1 and 2 are electrically insulated with reference to the inert mass 3 and are preferably coated on each of their surfaces by a thin insulating layer. Suitable wires are attached to said spiral-shaped springs, and pass through the casing of the seismograph, so as to reach the insulated terminals.

It is thus apparent that said spiral springs form the electrodes of a condenser, the capacity of which varies, as disclosed hereinafter, under the action of the seismograph when energized.

Figure 2:
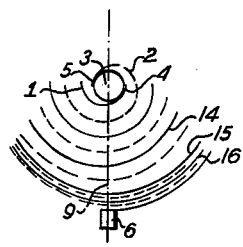
FIG. 2 is a partial view thereof, illustrating the deformation of the springs when, the axis of the seismograph being laid horizontally, the inert mass acts through its weight on said spiral springs.

In FIG. 2, the seismograph is shown with the axis of the inert mass 3 extending horizontally with an angular setting such that the terminal 6 lies in a vertical plane 9 passing through the axis of the inert mass 3.

By reason of the action of gravity on the mass 3, the spacing between the axis of said mass 3 and the terminal 6 secured to the casing is reduced. The outer convolutions of the spiral springs 1 and 2 are thus urged towards each other under the action of the weight of the mass 3 in the area adjacent the vertical plane 9. When following the springs from the outside towards the center, the bending momentum produced by the weight of the mass 3 is gradually reduced so that a number of convolutions such as those carrying the reference numbers 14 and 15 are no longer in contact with each other in said area adjacent the vertical plane 9, while being however very near each other; the convolutions of the two springs which are nearer the center are clearly spaced with reference to each other.

When seismic vibrations exerted in the vertical plane act on the seismograph thus arranged horizontally, the mass 3 moves under the action of its inertia in a vertical plane with reference to the casing, so as to compress the convolutions or to space them slightly with reference to one another, which leads to a modification in capacity. The capacity corresponding to the convolutions other than the outer convolutions 14 and 15 does not vary substantially. In contradistinction, the capacity provided by the sections of the convolutions 14 and 15 lying adjacent the vertical plane 9, varies substantially, since the convolutions are almost in contact with each other in said area, and the modification in capacity is proportional to the relative modification of the spacing between the convolutions. Consequently, the modification in capacity in said section of the spring structure is responsible for almost the entirety of the modifications in capacity of the condenser constituted by the two springs under the action of the vertical vibrations.

Figure 3:
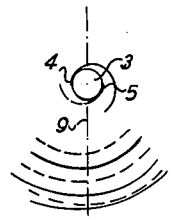
FIG. 3 is a further partial view of the spring convolutions when, the seismograph, being again arranged horizontally, is angularly shifted by 90° with reference to the setting illustrated in FIG. 2.

It will be readily ascertained that the operation is substantially similar when the seismograph casing is angularly shifted with reference to the axis of the tube or the like mass 3 by any angle, for instance when it is shifted by 90°, as illustrated in FIG. 3, so that the line joining the starting points of the springs at 4 and 5 is vertical instead of being horizontal.

As a matter of fact, and as precedingly, the sections of the convolutions of the two springs which are almost in contact with each other in the vicinity of the vertical plane 9, are responsible for the modifications in capacity and experience shows that the sensitivity of the seismograph is substantially independent of its angular setting, which leads to the desired results.

On the other hand, the horizontal vibrations produce in practice no modification in capacity and this will be readily understood since such vibrations produce, as a first approximation, only an angular shifting of the area of the convolutions 14 and 15 which are almost in contact with one another without modifying their actual spacing.

FIG. 1 is a view of the chief components of the seismograph, to wit: the casing 10, of which one of the sidewalls is removable, the spiral-shaped springs 1 and 2 and the inert mass 3.

It is apparent that in a seismograph of this type, the spiral springs play a double part: from a mechanical standpoint, they form a connection between the inert mass and the casing and, from an electrical standpoint, they form the electrodes of a variable condenser.

Preferably, the elasticity of the springs is selected in a manner such that, on the one hand, they are crushed partly under the action of the weight of the mass 3, so as to make a number of convolutions reliably move towards one another down to almost contacting and, on the other hand, the frequency of resonance of the elastic system formed by the inert mass and the spiral springs may have a value which allows amplifying to a maximum the frequencies of the vibrations it is desired to record by way of preference.

The casing is preferably fluidtight, so as to cut out any possible entrance of dust inside the seismograph. The damping of the vibrations may be obtained in any desired manner known per se. It is, for instance, possible to provide a damping by air, provided a very small clearance is left between the lateral edges of the spring and the sidewalls of the casing 10. It is also possible to fill the casing 10 with a wetting liquid of a suitable specific weight and viscosity. It is also possible to magnetically damp the vibrations, in which case the rod or inert mass 3 is constituted by a permanent magnet and the casing 10 is made of a magnetic metal.

In order to reduce as much as possible the natural resonant frequency of the seismograph, it is possible to increase the apparent weight of the inert mass. The use of a permanent magnet allows reaching said result by reason of the magnetic action arising between the magnet and the correspondingly shaped casing.

As a modification, it is possible to execute the seismograph by means of a single spirally shaped spring carrying the inert mass, in which case said spring includes two condenser plates formed by metal blades secured to each other by means of an insulating layer of a substantial thickness; the operation of this modification is the same as that of the embodiment illustrated.

What I claim is:

1. A seismograph comprising a horizontally extending elongated casing, an elongated inert mass lying inside the casing substantially along its axis and a condenser including two elastic metallic blades wound spirally inside the casing round the inert mass with a normally uniform spacing between the corresponding convolutions of the two blades, and means securing rigidly the inner and outer ends of the blades to the inert mass and to the casing respectively to support the mass inside the casing.

2. A seismograph comprising a horizontally extending elongated casing, an elongated inert cylindrical mass lying inside the casing substantially along its axis and a condenser including two spaced insulated elastic blades arranged in similar spiral shape round the inert mass inside the casing, the inner ends of said blades being secured to diametrically opposed generating lines of the inert mass, and the outer ends of which are secured to the casing along lines arranged to either side of the inert mass in a common plane passing through the axis of said mass.

3. A seismograph comprising a horizontally extending elongated casing, an elongated inert mass lying inside the casing substantially along its axis and a condenser including two elastic metallic blades wound spirally inside the casing round the inert mass with a normally uniform spacing between the corresponding convolutions of the two blades, means securing rigidly the inner and outer ends of the blades to the inert mass and to the casing respectively to support the mass inside the casing, and means for damping the vibrations produced by the seismic waves.

4. A seismograph comprising a horizontally extending elongated casing of magnetic material, an elongated magnet lying inside the casing substantially along its axis and a condenser including two elastic metallic blades wound spirally inside the casing round the said magnet with a normally uniform spacing between the corresponding convolutions of the two blades, and means securing rigidly the inner and outer ends of the blades to the said magnet and to the casing respectively to support the magnet inside the casing.

5. A seismograph comprising a horizontally extending elongated casing, an elongated inert mass lying inside the casing substantially along its axis and a condenser including two elastic metallic blades wound spirally inside the casing round the inert mass with a normally uniform spacing between the corresponding convolutions of the two blades, and means securing rigidly the inner and outer ends of the blades to the inert mass and to the casing respectively to support the mass inside the casing, the elasticity of the blades allowing substantial contact between the outermost convolutions of the springs for large seismic waves and the resonance of the condenser corresponding to the frequency of the vibrations to be recorded by way of preference.

6. A seismograph comprising a horizontally extending elongated casing, an elongated inert mass lying inside the casing substantially along its axis and a condenser including two elastic metallic blades wound spirally together with the interposition of a thick insulating layer inside the casing round the inert mass, and means securing rigidly the inner and outer ends of the blades to the inert mass and to the casing respectively to support the mass inside the casing.

No references cited.